United States Patent [19]

Mikado

[11] Patent Number: 4,620,228
[45] Date of Patent: Oct. 28, 1986

[54] TELEVISION SIGNAL GENERATOR

[75] Inventor: Tsuneo Mikado, Tokyo, Japan

[73] Assignee: Nippon Television Industry Corporation, Tokyo, Japan

[21] Appl. No.: 622,134

[22] Filed: Jun. 19, 1984

[30] Foreign Application Priority Data

Jun. 23, 1983 [JP] Japan .................................. 58-113476

[51] Int. Cl.$^4$ .............................................. H04N 5/14
[52] U.S. Cl. .................................... 358/160; 358/182; 358/22; 340/728
[58] Field of Search ................ 358/160, 227, 182, 183, 358/21 R, 22; 340/720, 723, 728

[56] References Cited

U.S. PATENT DOCUMENTS 4,495,491 1/1985 Postl .................................. 340/747 X Primary Examiner—James J. Groody
Assistant Examiner—E. Anne Toth
Attorney, Agent, or Firm—Woodcock Washburn Kurtz Mackiewicz & Norris

[57] ABSTRACT

Based on a first pattern signal representing a predetermined region on the screen, a second pattern signal is obtained which represents that the area of the predetermined region, increases, decreases and then returns to an original size over time, and the luminance level of the video signal including the first pattern signal is controlled in accordance with the second pattern signal. As a result, the flash can be generated from the pattern image.

5 Claims, 19 Drawing Figures

FIG. 1
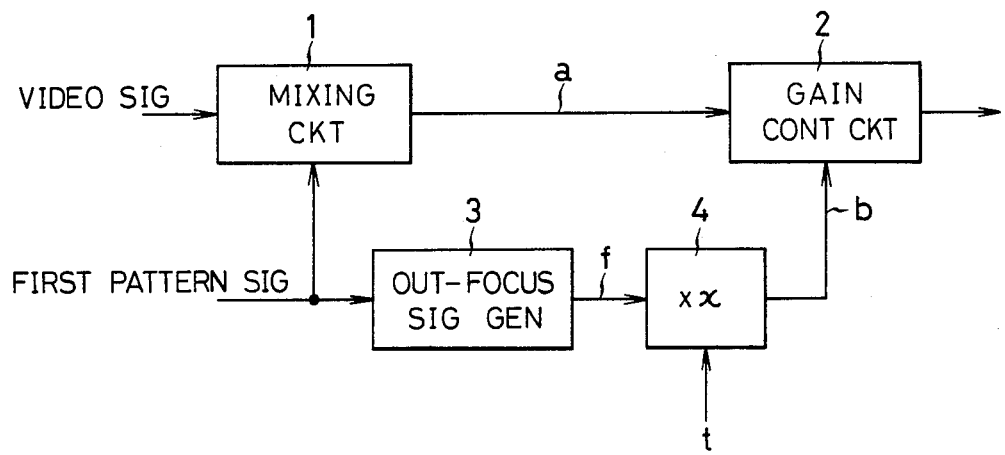
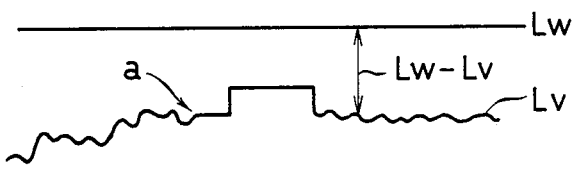
FIG. 3A
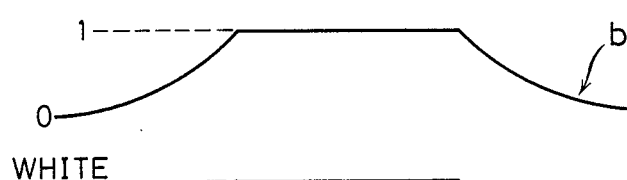
FIG. 3B
FIG. 3C

FIG.2B $t_1$ ($t_{19}$) [x0.2] 
FIG.2C $t_2$ ($t_{18}$) [x0.4] 
FIG.2D $t_3$ ($t_{17}$) [x0.6] 
FIG.2E $t_4$ ($t_{16}$) [x0.8] 
FIG.2F $t_5$ ($t_{15}$) [x 1] 
FIG.2G $t_6$ ($t_{14}$) [x1.2] 
FIG.2H $t_7$ ($t_{13}$) [x1.4] 
FIG.2I $t_8$ ($t_{12}$) [x1.6] 
FIG.2J $t_9$ ($t_{11}$) [x1.8] 
FIG.2K $t_{10}$ [x 2] 

t0 (t20) —6 t1 (t19) —6 t2 (t18) —6 t3 (t17) —6 t4 (t16) —6 t5 (t15)

t6 (t14)

t8 (t12)

t10

| X0.063 (m−1,n−1) | X0.125 (m,n−1) | X0.063 (m+1,n−1) |
|---|---|---|
| 0.125 (m−1,n) | X0.25 (m,n) | X0.125 (m+1,n) |
| X0.063 (m−1,n+1) | 0.125 (m,n+1) | X0.063 (m+1,n+1) |

TELEVISION SIGNAL GENERATOR

BACKGROUND OF THE INVENTION

The present invention relates to a television signal generator for generating a flash around a pattern image such as a character, a numeral and a symbol.

In order to generate a flash around a pattern image such as a character, a numeral or a symbol according to a conventional apparatus, a flash portion must be written in an original film, resulting in cumbersome operation.

OBJECT OF THE INVENTION

It is an object of the present invention to provide a circuit means for electrically generating a flash around a pattern image.

According to the present invention, based on a first pattern signal representing a predetermined region on the screen, a second pattern signal is obtained which represents that the area of the predetermined region, increases, decreases and then returns to an original size over time, and the luminance level of the video signal including the first pattern signal is controlled in accordance with the second pattern signal. As a result, the flash can be generated from the pattern image.

BRIEF DESCRIPTION OF THE DRAWINGS

FIG. 1 is a block diagram of a television signal generator according to an embodiment of the present invention;

FIGS. 2A to 2K are respectively timing charts of signals for further explaining the operation of the television signal generator shown in FIG. 1;

FIGS. 3A to 3C are respectively timing charts of signals for further explaining the operation of the television signal generator shown in FIG. 1;

DETAILED DESCRIPTION OF THE PREFERRED EMBODIMENT

A preferred embodiment of the present invention will now be described with reference to the accompanying drawings.

Figure 2A:

FIG. 1 is a block diagram of a television signal generator to which the present invention is applied, FIGS. 2A to 2K and FIGS. 3A to 3C show signals for explaining the operation of the television signal generator. Referring to FIG. 1, a first pattern signal representing a character, a symbol, a figure or the like is supplied to a mixing circuit 1 and is mixed with a video signal. A composite signal a from the mixing circuit 1 is supplied to a gain control circuit 2. The first pattern signal has, for example, a waveform as shown in FIG. 2A. The composite signal a from the mixing circuit 1 is illustrated in FIG. 3A.

On the other hand, the first pattern signal is also supplied to an out-focus generator (second pattern signal generator) 3. An out-focus signal f (second pattern signal) is generated on the basis of the first pattern signal. The out-focus signal f serves to increase the area of the pattern (e.g., character and figure) represented by the first pattern signal. The luminance of the pattern is decreased toward the peripheral portion of the pattern of the increased area. The out-focus signal f is obtained when a television camera is defocused from an in-focus point and picks up an image of an object. The out-focus signal f has a longer duration than the original pattern signal, as shown in FIG. 2F. The luminance level of the out-focus signal f is represented by moderate ramp portions. The outline of the image displayed in accordance with this signal becomes blurred.

The out-focus signal f is supplied to a voltage range multiplier (x×) 4. A scale factor × is multiplied with a level of the out-focus signal f, and a resultant product is supplied as a gain control signal b (= ×f) to the control input terminal of the gain control circuit 2. A time signal t is supplied to change the scale factor × of the voltage range multiplier 4. For example, as shown in FIGS. 2B to 2K, the scale factor × changes in an order of 0.2, 0.4, 0.6, ..., 1, ... and 2 during a time interval between time t1 and time t10. The scale factor × then changes from 2 to 0.2 between time t11 and t19. As a result, signals having different levels can be obtained as the gain control signals, as shown in FIGS. 2B to 2K. The level of the signal is gradually increased from 0.2 (time t1) in FIG. 2B, 1 (time t5) in FIG. 2F to 2 (time t10) in FIG. 2K when the level of the out-focus signal f in FIG. 2F is given as the reference (1). During a time interval from time t11 to time t14, the level is gradually lowered in an order opposite to that during the time interval between time t6 and time t9. When the scale factor is not less than 1, the top portion of the sinusoidal out-focus signal f is clipped as shown in FIGS. 2G to 2K (time t6 to time t10 and time t11 to time t14) so that the signal is kept below the maximum level.

The gain of the input signal a (in FIG. 3A) is controlled by the gain control circuit 2 in response to the gain control signal b (FIG. 3B) whose level changes over time, as shown in FIGS. 2B to 2K. As shown in FIG. 3C, the level of the gain control signal b is converged at the white level when the gain control signal b is set at level "1". However, when the gain control signal b is set at level "0", the luminance level of the input signal a appears without any change. When the level of the gain control signal b changes between level "0" and level "1", the luminance level of the input signal a continuously changes between the white level and the luminance level of the original signal in accordance with the ratio corresponding to the level of the gain control signal b.

As a result, the luminance level of the pattern image and its surrounding area is gradually increased to substantially reach the white level and is then gradually decreased to obtain the normal luminance level. This change in image is completed in one second (time t1 to time t19), thereby generating a flash around the pattern image.

Figure 4:
FIG. 4 is a representation for explaining the pattern of changes in luminance of the pattern image processed by the television signal generator of FIG. 1.
Figure 4:
Figure 4:
Figure 4:
Figure 4:
Figure 4:
Figure 4:
Figure 4:
Figure 4:

FIG. 4 is a representation showing changes in luminance of a small circular pattern image processed by the circuit of FIG. 1. At time t0, a gray circular pattern 6 is displayed on the screen. The luminance of the grey circular pattern 6 and a surrounding area is gradually increased from time t1. Changes in luminance are indicated by black dots for illustrative convenience in FIG. 4. At time t6, the area of the pattern 6 is set substantially at the white level. Up to time t10, the luminance is continuously increased, and area enlargement continues. Thereafter, the luminance is gradually decreased to restore the original luminance at time t20.

The gain control circuit 2 shown in FIG. 1 may comprise a gain-controlled amplifier whose gain is controlled in response to the gain control signal b when analog processing is performed.

However, when digital processing is performed, the gain control circuit 2 may comprise an arithmetic circuit for calculating in accordance with equation (1):

$$L_{out} = L_v + (L_w - L_v) \times b \quad (1)$$

where $L_v$ is the level of the input signal a and $L_w$ is the white peak level. According to equation (1), when the level of the gain control signal b is set at "0", the output level $L_{out}$ of the gain control circuit 2 becomes equal to the input level $L_v$. However, when the level of the gain control signal b is set at "1", the output level becomes equal to the white level $L_w$. When the level of the gain control signal b falls within the range between "0" and "1", a value obtained by multiplying the ratio b with a difference $(L_w - L_v)$ is added to the original level $L_v$.

The level $L_w$ of equation (1) can be a red luminance level $L_R$ when a red flash is generated. In addition, in this case, a red color subcarrier $f_{SC(R)}$ is superposed on the level $L_R$. When the level of the gain control signal b is set to be "1", a red signal $L_R + f_{SC(R)}$ is obtained. When the level of the gain control signal b is set to be "0", the resultant signal has the original input level $L_v$. When the level of the gain control signal b falls within the range between "0" and "1", a transient signal is obtained wherein the luminance level changes in accordance with the ramp portions of the gain control signal b, and the level (amplitude) of the red color subcarrier changes in accordance with the change in luminance. Therefore, the pattern image and the area surrounding the pattern image is gradually colored red over time, and the red region is gradually decolored to restore the original pattern image. The red saturation changes in accordance with changes in luminance in the peripheral area of the red flash portion.

Figure 5:
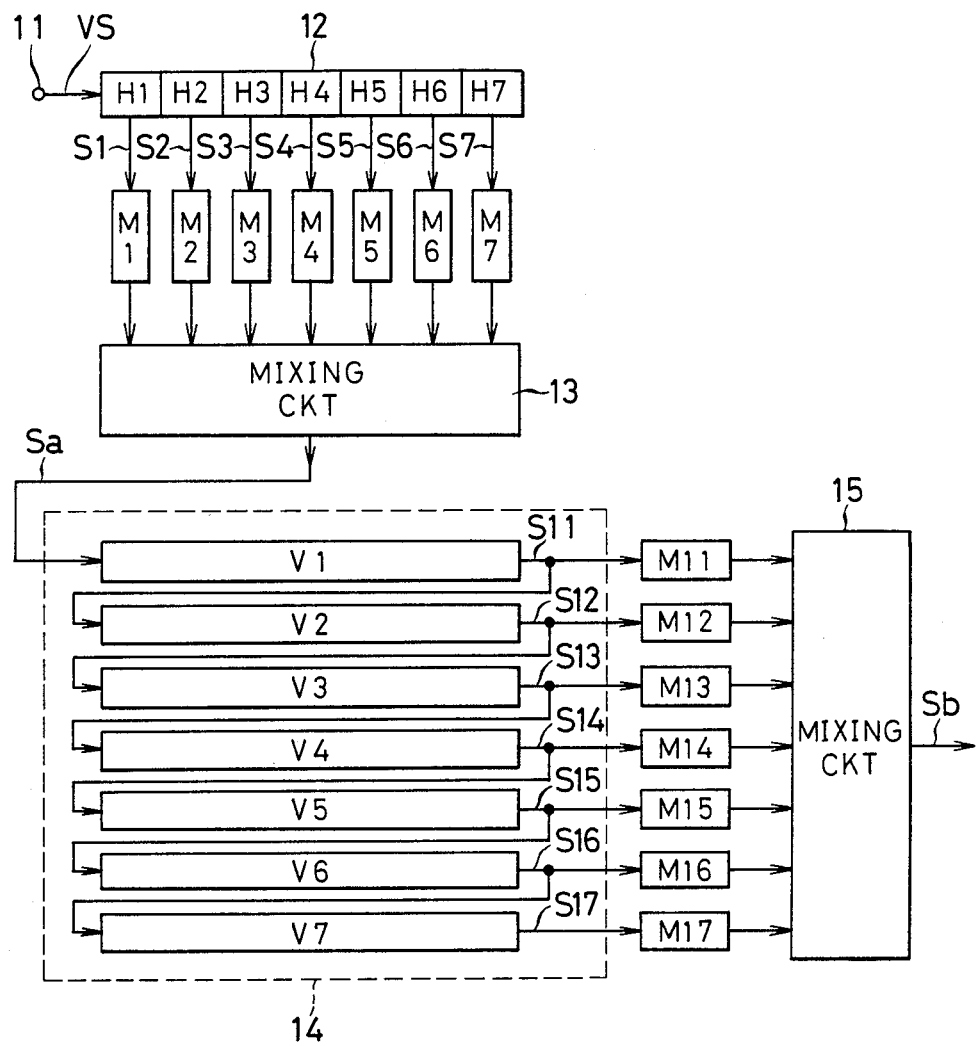
FIGS. 5 and 6 are respectively block diagrams showing the detailed configuration of an out-focus signal generator in the television signal generator of FIG. 1.

FIG. 5 is a block diagram of the out-focus signal generator 3 in FIG. 1. A pattern signal is supplied to an input terminal 11 and is delayed by a pixel clock period by a horizontal delay circuit 12. Signals S1 to S7, delayed by one pixel appear at a plurality (seven) of tap outputs of the horizontal delay circuit 12, respectively. These delayed signals S1 to S7 are supplied to multipliers M1 to M7, respectively, and are multiplied with scale factors, for example, 0.25, 0.5, 0.75, 1, 0.75, 0.5 and 0.25, respectively. The multiplied signals are mixed by a mixing circuit 13 which then generates a composite signal Sa. By this operation, the signal (discrete values as a function of time) having the level changing as shown in FIG. 2F is obtained.

Assume a dot pattern signal representing one pixel. The dot pattern signal is delayed by the horizontal delay circuit 12 which then generates seven discrete signals in the horizontal period. The different coefficients (scale factors) in accordance with predetermined ramp functions are multiplied with these discrete signals, and the resultant signals are mixed by the mixing circuit 13, thereby obtaining the out-focus signal as described above.

The output Sa from the mixing circuit 13 of FIG. 5 is also supplied to a vertical delay circuit 14 which then generates 1V-delayed signals S11 to S17 from its taps. The signals S11 to S17 are then multiplied with the same coefficients as described above by multipliers M11 to M17, so that a mixing circuit 15 generates a signal Sb having a vertical period of changing level.

As a result, the out-focus signal is generated by the circuit of FIG. 5. The area of the image represented by the original pattern signal is enlarged by the out-focus signal to constitute a region consisting of 7 pixels in the horizontal direction and 7 pixels in the vertical direction, and the luminance level of the out-focus signal is gradually decreased toward the peripheral area in the horizontal and vertical directions.

Figures 6, 7:
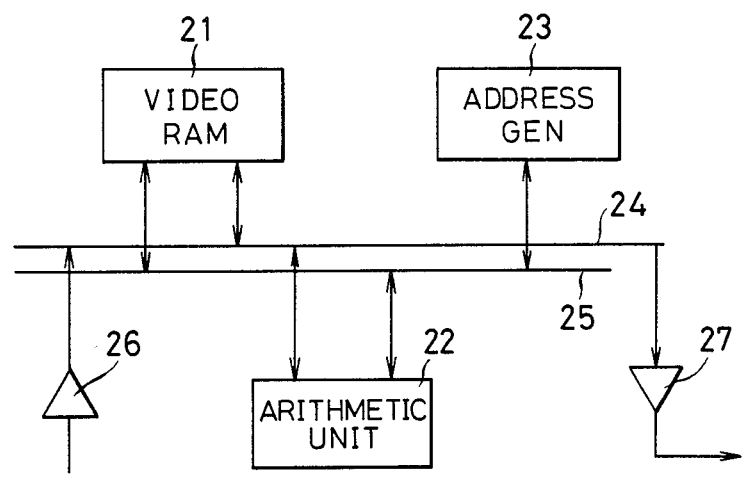
FIG. 7 is a memory map showing an address area of a RAM of FIG. 6.

FIG. 6 shows another arrangement of the out-focus signal generator 3. In this case, the out-focus signal generator 3 comprises a video RAM 21 for storing the original pattern signal, an arithmetic unit 22 and an address generator 23. The video RAM 21, the arithmetic unit 22 and the address generator 23 are commonly connected to a data bus 24 and an address bus 25. The video RAM 21 has a memory area corresponding to one frame. The video RAM 21 stores 8-bit digital video signals each representing one pixel. The pattern signal of FIG. 1 is stored in the video RAM 21 through an input buffer 26. The address generator 23 sequentially generates read address signals to access corresponding addresses A(m,n) of the video RAM 21. The data at the addresses A(m,n) are read out and supplied to the arithmetic unit 22. The eight data corresponding to the eight addresses of the surrounding area, as shown in FIG. 7, are formed such that the original data is multiplied with scale factors 0.25, 0.125 and 0.063. These data are added to the data of addresses A(m−1,n−1), A(m,n−1), . . . and A(m+1,n+1), and the resultant data are stored in the video RAM 21. The above operation is performed for all pixels corresponding to the addresses A(m,n) and is repeated on the entire screen to obtain the out-focus signal for enlarging the area of the original pattern image and for decreasing the luminance level of the area toward the peripheral portion of the pattern of enlarged area. The out-focus signal is supplied to the voltage range multiplier 4 of FIG. 1 through an output buffer 27 of FIG. 6.

The above embodiment uses an out-focus signal for enlarging the area of the pattern image and decreasing the luminance level toward the peripheral portion of the enlarged pattern image. However, a pattern signal can be produced so as to only increase/decrease the area of the pattern image over time. The gain control circuit 2 may be controlled in accordance with this pattern signal to generate a flash from the original pattern image. More specifically, the coefficients of the multipliers M1 to M17 are changed over time as follows:

|    | M1 | M2 | M3 | M4 | M5 | M6 | M7 |
|----|----|----|----|----|----|----|----|
| t1 | 0  | 0  | 0  | 1  | 0  | 0  | 0  |
| t2 | 0  | 0  | 1  | 1  | 1  | 0  | 0  |
| t3 | 0  | 1  | 1  | 1  | 1  | 1  | 0  |
| t4 | 1  | 1  | 1  | 1  | 1  | 1  | 1  |
| t5 | 0  | 1  | 1  | 1  | 1  | 1  | 0  |
| .  |    |    |    |    |    |    |    |
| .  |    |    |    |    |    |    |    |

The gain control pattern signal can be obtained so that only the area of the pattern image is enlarged and then contracted over time.

Alternatively, the out-focus signal shown in FIG. 2F is produced on the basis of the original pattern signal. The amplitude of the out-focus signal is sliced at levels $L_1, L_2, \ldots$ over time, and the signal levels are multiplied such that the respective sliced levels become "1", thus obtaining the control signal to be supplied to the gain control circuit 2 of FIG. 1.

According to the present invention as described above, an electrical circuit can generate a flash in accordance with a change in luminance of the pattern image and the surrounding area. In addition, a color flash can also be generated.

What is claimed is:

1. A television signal generator comprising:
a pattern signal generator receiving a first pattern signal representing a predetermined region on a screen and producing a second pattern signal which causes an area of the predetermined region to increase and then decrease to an original value over time; and a gain control circuit receiving said second pattern signal for controlling as a function of said second pattern signal a luminance level of a video signal including the first pattern signal.

2. A television signal generator comprising:
a pattern signal generator receiving a first pattern signal representing a predetermined region on a screen and producing a second pattern signal which causes an area of the predetermined region to increase and then decrease to an original value over time and which causes a luminance level to gradually decrease toward a peripheral portion of the predetermined region increased in area; and a gain control circuit receiving said second pattern signal for controlling as a function of said second pattern signal a luminance level of a video signal including the first pattern signal.

3. A television signal generator comprising:
a pattern signal generator receiving a first pattern signal representing a predetermined region on a screen and producing a second pattern signal which causes an area of the predetermined region to increase and then decrease to an original value over time and which causes a luminance level to gradually decrease toward a peripheral portion of the predetermined region increased in area; a voltage range multiplier for increasing and then decreasing a level of the second pattern signal over time; and a gain control circuit receiving said second pattern signal for controlling as a function of said second pattern signal a luminance level of a video signal including a firs pattern signal.

4. A television signal generator comprising:
a pattern signal generator receiving a first pattern signal representing a predetermined region on a screen and producing a second pattern signal which causes an area of the predetermined region to increase and then decrease to an original value over time and which causes a luminance level to gradually decrease toward a peripheral portion of the predetermined region increased in area; and a gain control circuit receiving said second pattern signal for changing a luminance level $L_v$ of a video signal including the first pattern signal with respect to a predetermined target level $L_O$ as a function of a level change b in the second pattern signal so as to satisfy a relation $L_v + (L_O - L_v) \times b$, whereby the level change b in the second pattern signal falls within a range between "0" and "1", the level $L_v$ of the original video signal is obtained when the level change b comes close to "0", the target level $L_O$ is obtained when the level change b comes close to "1", and a transient level between the levels $L_O$ and $L_v$ is obtained when the level change b falls in a range between "0" and "1".

5. A television signal generator comprising:
a pattern signal generator receiving a first pattern signal representing a predetermined region on a screen and producing a second pattern signal which causes an area of the predetermined region to increase and then decrease to an original value over time and which causes a luminance level to gradually decrease toward a peripheral portion of the predetermined region increased in area; and a gain control circuit receiving said second pattern signal for changing a luminance level $\bar{L}_v$ of a video signal including the first pattern signal with respect to a predetermined target level $L_O$ as a function of a level change b in the second pattern signal so as to satisfy a relation $L_v + (L_O - L_v) \times b$, whereby the level change b falls within a range between "0" and "1" when a color subcarrier $f_{SC}$ for generating a predetermined color is superposed on the target level $L_O$, so that the level $L_v$ of the original video signal is obtained when the level change b comes closed to "0", a superposed target level $(L_O + f_{SC})$ is obtained when the level change b comes close to "1", and a transcient is obtained when the level change b falls in a range between "0" and "1".

* * * * *